(12) United States Patent
Termenon

(10) Patent No.: US 10,274,067 B2
(45) Date of Patent: Apr. 30, 2019

(54) HYDROKINETIC TORQUE-COUPLING DEVICE HAVING LOCK-UP CLUTCH OPERATIVELY CONNECTED TO TORSIONAL VIBRATION DAMPER, AND RELATED METHODS

(71) Applicant: VALEO EMBRAYAGES, Amiens (FR)

(72) Inventor: Norberto Termenon, Paris (FR)

(73) Assignee: Valeo Embrayages, Amiens (FR)

(*) Notice: Subject to any disclaimer, the term of this patent is extended or adjusted under 35 U.S.C. 154(b) by 260 days.

(21) Appl. No.: 15/363,912

(22) Filed: Nov. 29, 2016

(65) Prior Publication Data
US 2018/0149249 A1 May 31, 2018

(51) Int. Cl.
*F16H 45/02* (2006.01)
*F16D 13/40* (2006.01)
*F16F 15/123* (2006.01)

(52) U.S. Cl.
CPC ............. *F16H 45/02* (2013.01); *F16D 13/40* (2013.01); *F16F 15/123* (2013.01); *F16H 2045/0205* (2013.01); *F16H 2045/0221* (2013.01); *F16H 2045/0247* (2013.01); *F16H 2045/0278* (2013.01)

(58) Field of Classification Search
CPC ............. F16H 45/02; F16H 2045/0221; F16H 2045/0205; F16H 2045/0278; F16H 2045/0247; F16F 15/123; F16D 13/40
See application file for complete search history.

(56) References Cited

U.S. PATENT DOCUMENTS 5,103,947 A 4/1992 Okuzumi
5,667,042 A * 9/1997 Olsen .................... F16H 45/02
192/3.29
(Continued)

FOREIGN PATENT DOCUMENTS

DE 3224405 A1 1/1984
DE 4109485 A1 9/1992
(Continued)

OTHER PUBLICATIONS

International Search Report and Written Opinion for PCT/EP2017/080941, dated Aug. 30, 2018.

*Primary Examiner* — Stacey A Fluhart
(74) *Attorney, Agent, or Firm* — Berenato & White, LLC

(57) ABSTRACT

A hydrokinetic torque-coupling device features a casing rotatable about a rotational axis and having an engagement surface, a torque converter including an impeller wheel and a turbine wheel, a locking piston including a piston body and a damper assembly. The piston body has a front surface axially facing the engagement surface of the casing. The locking piston is axially moveable along the rotational axis to and from the engagement surface of the casing to selectively engage the locking piston against the engagement surface of the casing in a lock-up mode. The damper assembly comprises an input member rotatable about the rotational axis and non-moveably attached to the turbine wheel, circumferentially acting elastic members and an output member elastically coupled to the input member trough the elastic members. The locking piston is non-rotatably connected to and axially moveable relative to the input member of the torsional vibration damper.

17 Claims, 9 Drawing Sheets

(56) References Cited

U.S. PATENT DOCUMENTS

| | | | |
|---|---|---|---|
| 6,142,272 A * | 11/2000 | Meisner | F16F 15/1207 |
| | | | 192/212 |
| 6,217,476 B1 * | 4/2001 | Muller | B60K 6/26 |
| | | | 192/25 |
| 7,083,029 B2 | 8/2006 | Seebacher et al. | |
| 9,989,136 B2 * | 6/2018 | Takikawa | F16H 45/02 |
| 2003/0217902 A1 * | 11/2003 | Kuwahara | F16H 45/02 |
| | | | 192/3.29 |
| 2007/0246317 A1 * | 10/2007 | Tomiyama | F16H 45/02 |
| | | | 192/3.29 |
| 2012/0255825 A1 * | 10/2012 | Ochi | F16H 45/02 |
| | | | 192/3.29 |
| 2016/0327142 A1 * | 11/2016 | Takikawa | F16F 15/14 |
| 2018/0031100 A1 * | 2/2018 | Li | F16D 13/40 |

FOREIGN PATENT DOCUMENTS

| | | |
|---|---|---|
| DE | 4333562 A1 | 4/1994 |
| DE | 19515302 A1 | 11/1995 |

\* cited by examiner

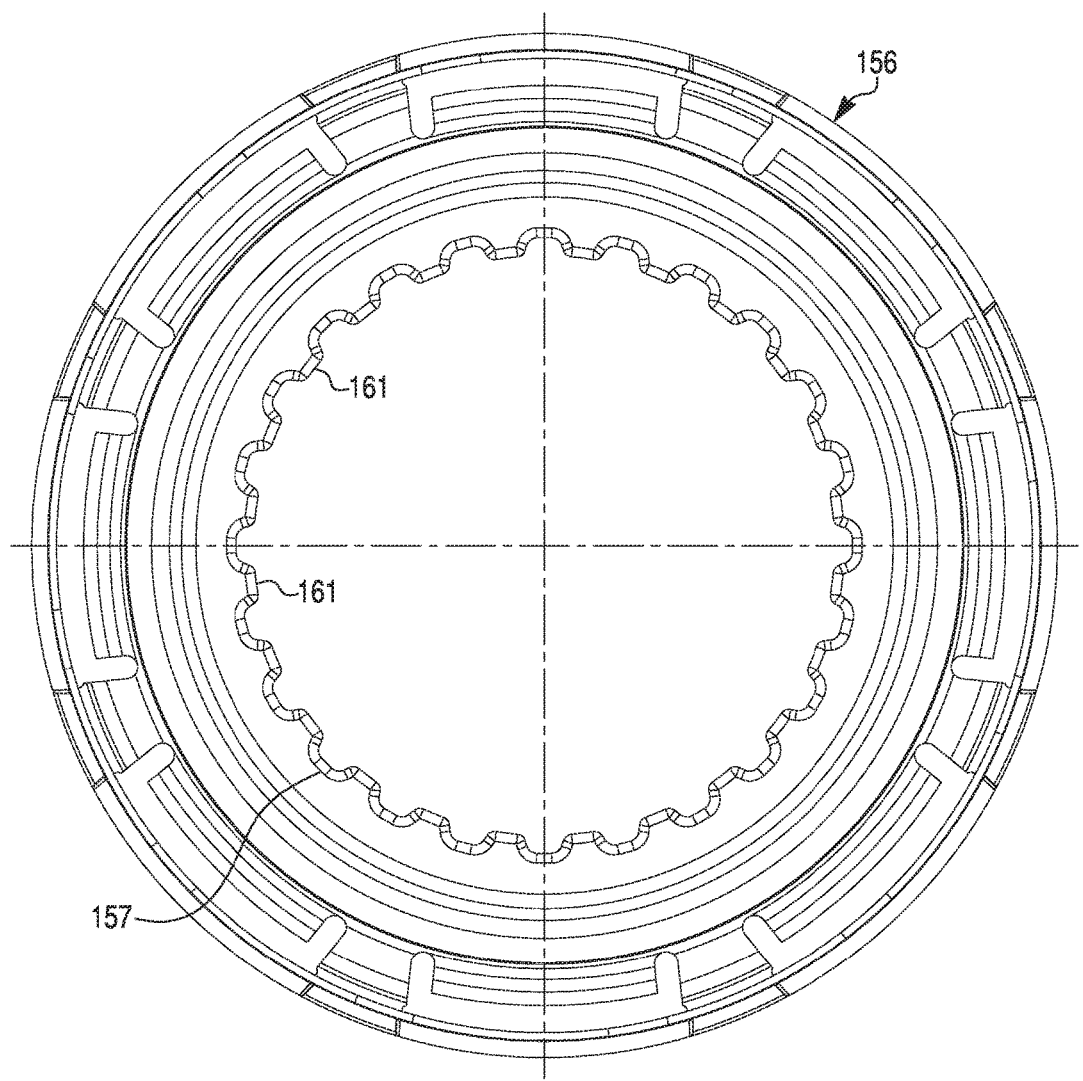

HYDROKINETIC TORQUE-COUPLING DEVICE HAVING LOCK-UP CLUTCH OPERATIVELY CONNECTED TO TORSIONAL VIBRATION DAMPER, AND RELATED METHODS

BACKGROUND OF THE INVENTION

1. Field of the Invention

The present invention generally relates to hydrokinetic torque-coupling devices, and more particularly to a hydrokinetic torque-coupling device including a lock-up clutch operatively connected to a torsional vibration damper.

2. Background of the Invention

Generally, vehicles with automatic transmissions are equipped with a hydrokinetic torque-coupling device for fluidly coupling the driving shaft of an engine to a driven shaft of a transmission. Lockup clutches are known for mechanically coupling the driving and driven shafts under certain operating conditions. Lock-up clutches and their operation are described in, for example, U.S. Pat. Nos. 8,276,723 and 7,191,879.

Depending on conditions, when the hydrokinetic torque-coupling device is transmitting rotational movement during lock-up operation, the action of the transmission fluid generates axial forces, which tend to move the turbine-piston away from the impeller, especially in coasting conditions of the motor vehicle when the transmission is at a higher rotational speed than the engine. These conditions frequently occur during downhill driving, for example. These forces vary depending on various factors, such as speed and torque. Under some stable or transient conditions, these forces may move the turbine-piston away from the impeller and untimely or prematurely disengage the lock-up in unexpected circumstances, when it is not desired. This can also create a load that disengages the lock-up in the coasting condition of the motor vehicle.

While hydrokinetic torque-coupling devices with lock-up clutches have proven to be acceptable for vehicular driveline applications and conditions, improvements that may enhance their performance and cost are possible.

As disclosed hereinbelow, such improvements may derive from, for example, reducing the spatial requirements of components of the hydrokinetic torque-coupling device and/or consolidating functions of two or more components into a single component.

BRIEF SUMMARY OF THE INVENTION

According to a first aspect of the invention, a hydrokinetic torque-coupling device is provided for coupling a driving shaft and a driven shaft. The torque-coupling device comprises a casing rotatable about a rotational axis and having an engagement surface, a torque converter including an impeller wheel and a turbine wheel disposed in the casing coaxially with the rotational axis, a locking piston including an annular piston body, and a torsional vibration damper. The piston body has a front surface axially facing the engagement surface of the casing. The locking piston is axially moveable along the rotational axis to and from the engagement surface of the casing so as to selectively frictionally engage the locking piston against the engagement surface of the casing in lock-up mode. The torsional vibration damper comprises an input member rotatable about the rotational axis and non-moveably attached to the turbine wheel, a plurality of circumferentially acting elastic members, and an output member elastically coupled to the input member through the elastic members. The locking piston is non-rotatably connected to and axially moveable relative to the input member of the torsional vibration damper. In other words, the connection between the locking piston and the input member of the torsional vibration damper is a connection allowing the transmission of torque while allowing the axial displacement of the locking piston.

According to a second aspect of the invention, a method is provided for assembling a hydrokinetic torque-coupling device for coupling a driving shaft and a driven shaft together. The method involves providing a torque converter comprising an impeller wheel and a turbine wheel coaxial with a rotational axis, providing a locking piston including an annular piston body coaxial with the rotational axis, providing a torsional vibration damper comprising an input member, circumferentially acting elastic members, and an output member elastically coupled to the input member through the elastic members, and mounting the locking piston to the torsional vibration damper coaxially with the input member so that the locking piston is non-rotatably connected to and axially moveable relative to the input member of the torsional vibration damper.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 9:
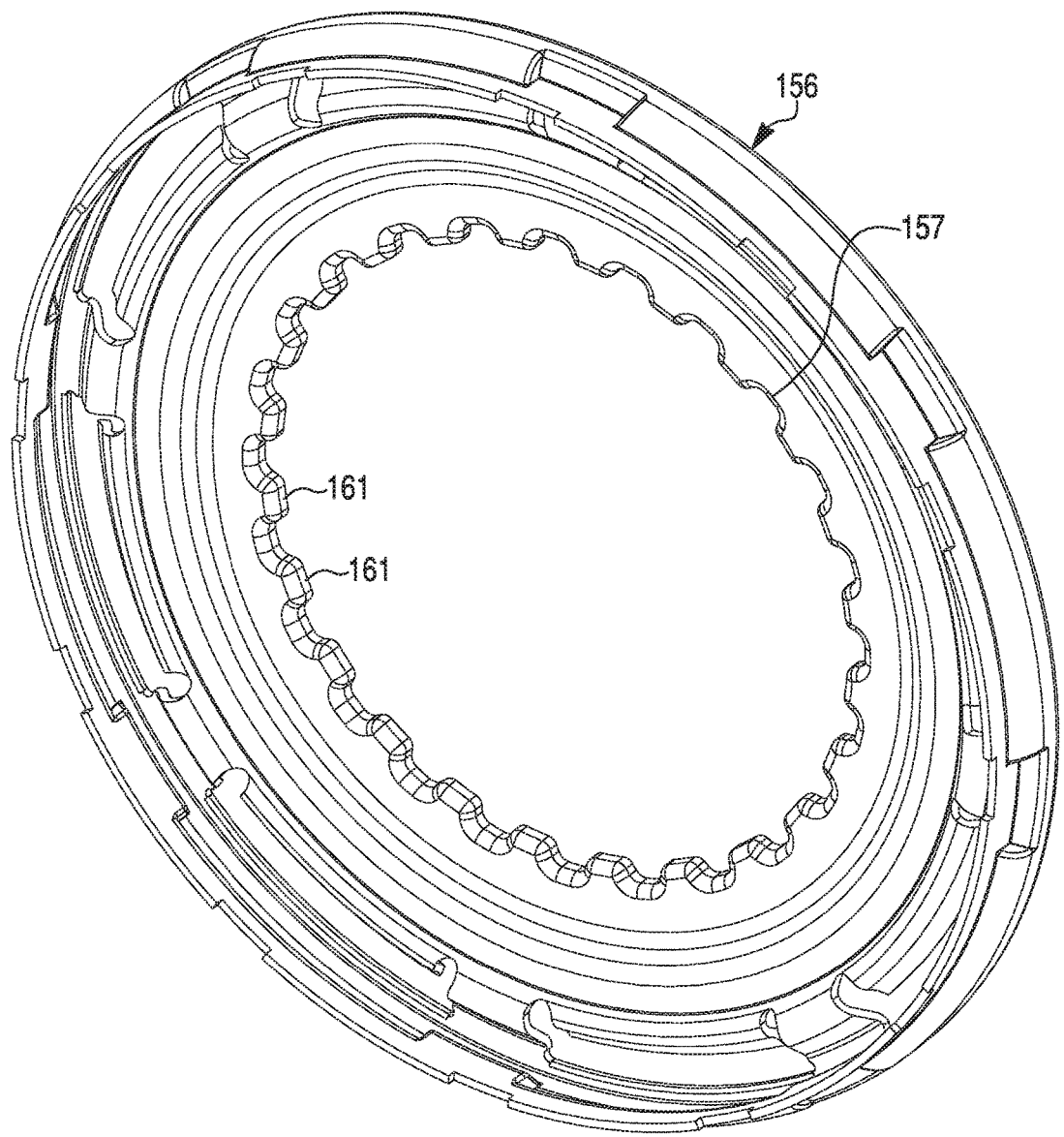

FIG. 9 is a perspective view of the drive member of the torsional vibration damper of the hydrokinetic torque-coupling device in accordance with the second exemplary embodiment of the present invention; and FIG. 10 is a front view of the drive member of the torsional vibration damper of the hydrokinetic torque-coupling device in accordance with the second exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

A first exemplary embodiment of a hydrokinetic torque-coupling device is generally represented in the accompanying drawings by reference numeral 10, as best shown in the fragmentary sectional views in FIGS. 1-5. The hydrokinetic torque-coupling device 10 is operable in known manner to fluidly couple a driving shaft and a driven shaft of a motor vehicle, such as of an automobile. In the typical case, the driving shaft is an output shaft of an internal combustion engine (not shown) of the motor vehicle and the driven shaft is connected to an automatic transmission of the motor vehicle.

The hydrokinetic torque-coupling device 10 includes a sealed casing 12 filled with a fluid, such as oil or transmission fluid. The sealed casing 12, a torque converter 14, a torsional vibration damper (also referred to herein as a damper assembly) 16, and a friction locking clutch 18 are all rotatable about a rotational axis X. The drawings discussed herein show half-views, that is, the portion or fragment of the hydrokinetic torque-coupling device 10 above the rotational axis X. Generally, the torque-coupling device 10 is symmetrical about the rotational axis X. Herein, the axial and radial orientations are considered with respect to the rotational axis X of the torque-coupling device 10. The relative terms such as "axially," "radially," and "circumferentially" are with respect to orientations parallel to, perpendicular to, and circularly around the rotational axis X, respectively.

Figure 1:
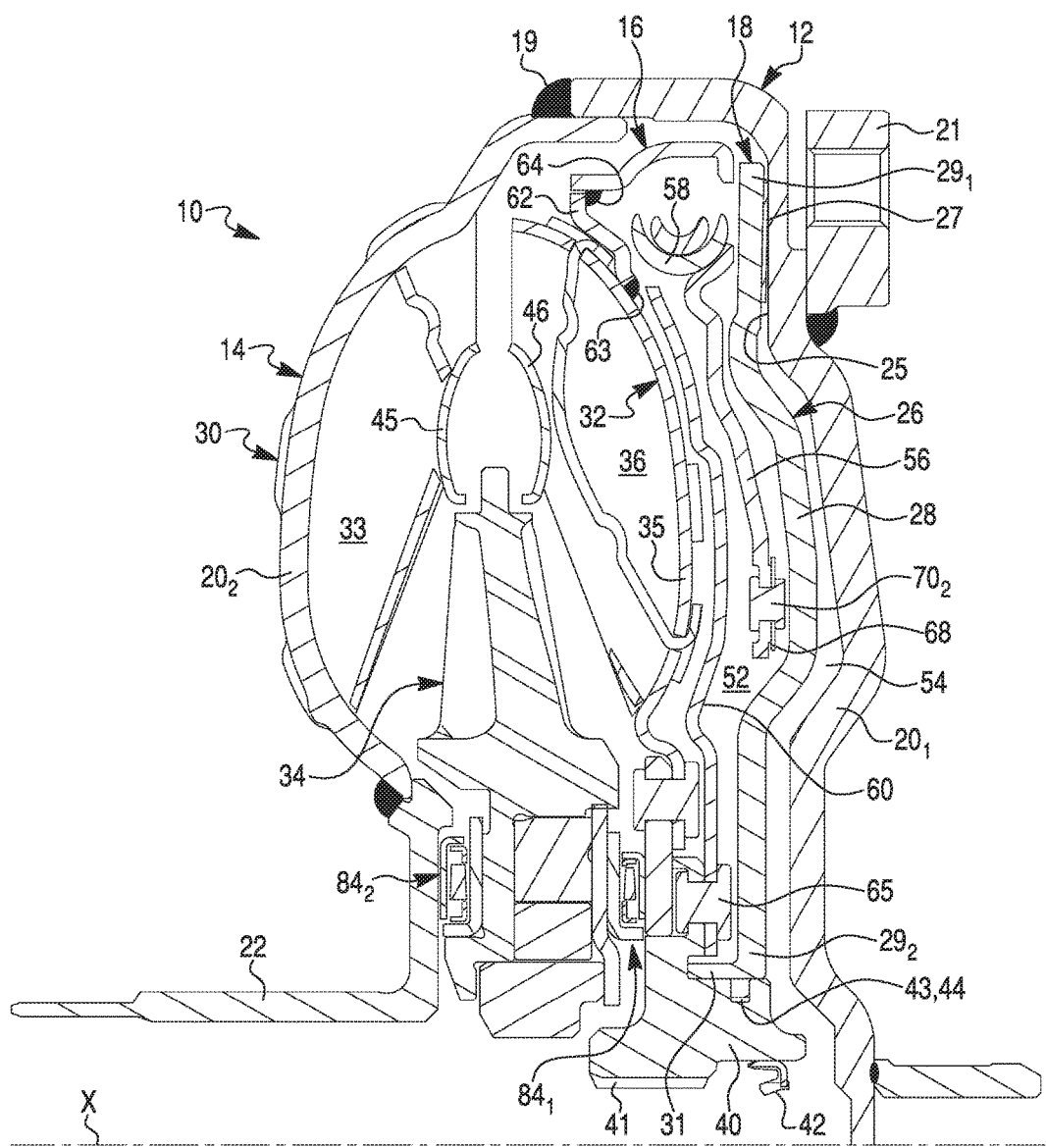
FIG. 1 is a fragmented half-view in axial section of a hydrokinetic torque-coupling device in accordance with a first exemplary embodiment of the present invention.

The sealed casing 12 according to the first exemplary embodiment as illustrated in FIG. 1 includes a first casing shell (or cover shell) $20_1$ and a second casing shell $20_2$ non-movably (i.e., fixedly) interconnected sealingly together, such as by welding at weld 19, at their outer peripheries, and non-movable relative to one another and yet rotatable about the rotational axis X. The first casing shell $20_1$ is non-movably (i.e., fixedly) interconnected to the driving shaft, more typically to a flywheel (not shown) that is fixed so as to be non-rotatable relative to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel thereof with studs 21. Each of the first and second casing shells $20_1$, $20_2$ may be made, for example, integrally by press-forming one-piece metal sheets. The first casing shell $20_1$ has an engagement surface 25 facing the torque converter 14 and the damper assembly 16 within the casing 12, best shown in FIG. 1.

The torque converter 14 includes an impeller wheel (sometimes referred to as the pump) 30, a turbine wheel 32, and a stator (sometimes referred to as the reactor) 34 interposed axially between the impeller wheel 30 and the turbine wheel 32. The impeller wheel 30, the turbine wheel 32 and the stator 34 are coaxially aligned with one another on the rotational axis X. The impeller wheel 30, the turbine wheel 32 and the stator 34 collectively form a torus. The impeller wheel 30 and the turbine wheel 32 may be fluidly (or hydro-dynamically) coupled to one another as known in the art.

The second casing shell $20_2$ of the casing 12 also forms and serves as an impeller shell of the impeller wheel 30. Accordingly, the impeller shell $20_2$ sometimes is referred to as part of the casing 12. The impeller wheel 30 includes the impeller shell $20_2$, a core ring 45, and a plurality of impeller blades 33 fixedly attached, such as by brazing, to the impeller shell $20_2$ and the core ring 45. The impeller wheel 30, including the impeller shell $20_2$, the core ring 45 and the blades 33, is fixedly (i.e., non-moveably) secured so as to be non-rotatable relative to the first casing shell $20_1$ and hence to the drive shaft (or flywheel) of the engine to rotate at the same speed as the engine output. The impeller wheel 30 also includes an impeller hub 22 fixedly secured to the impeller shell $20_2$. The impeller hub 22 is arranged for engagement with a hydraulic pump of the transmission.

The torque-coupling device 10 further includes an output hub 40 that is rotatable about the rotational axis X. The output hub 40 is operatively coupled to and coaxial with the driven shaft. For example, as best shown in FIG. 1, the output hub 40 may be provided with internal splines 41 for coupling the output hub 40 non-rotatably relative to the driven shaft, such as a transmission input shaft provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member 42, mounted to a radially inner peripheral surface of the output hub 40, creates a seal at the interface of a transmission input shaft and the output hub 40. Moreover, the turbine wheel 32 is rotatable relative to the output hub 40 around the rotational axis X.

The turbine wheel 32 includes a substantially toroidal turbine shell 35, a core ring 46, and a plurality of turbine blades 36 fixedly attached, such as by brazing, to the turbine shell 35 and the core ring 46. The rotation of the impeller wheel 30 causes transmission fluid in the torus to rotate the turbine blades 36, and hence the turbine shell 35.

The stator 34 is positioned between the impeller wheel 30 and turbine wheel 32 to redirect fluid from the turbine wheel 32 back to the impeller wheel 30 in an efficient manner. The stator 34 is typically mounted on a one-way clutch to prevent the stator 34 from counter-rotation. A first thrust bearing $84_1$ is interposed between the stator 34 and the turbine shell 35, while a second thrust bearing $84_2$ is interposed between the stator 34 and the impeller shell $20_2$ of the casing 12.

The lock-up clutch 18 includes a locking piston 26 axially displaceable along the rotational axis X toward (an engaged position (or lockup mode) of the lock-up clutch 18) and away (a disengaged position (or non-lockup) of the lock-up clutch 18) from the engagement surface 25 inside the cover shell $20_1$ of the casing 12. In other words, the locking piston 26 is provided to be selectively pressed against the engagement surface 25 of the casing 12 so as to lock-up the torque-coupling device 10 between the shafts so to control sliding movement between the turbine wheel 32 and the impeller wheel 30.

Figure 3:
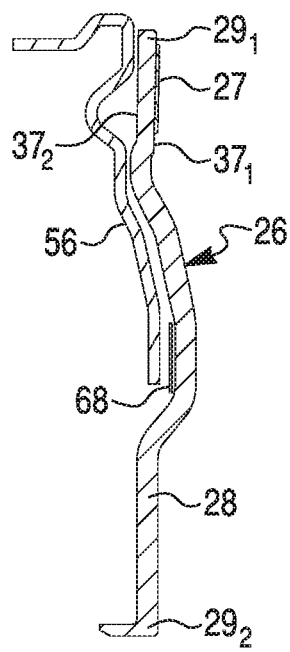
FIG. 3 is a fragmented cross-sectional view of the hydrokinetic torque-coupling device in accordance with the first exemplary embodiment of the present invention taken along the line 3-3 in FIG. 2 showing a locking piston and a drive member of the torsional vibration damper only.
Figure 3:
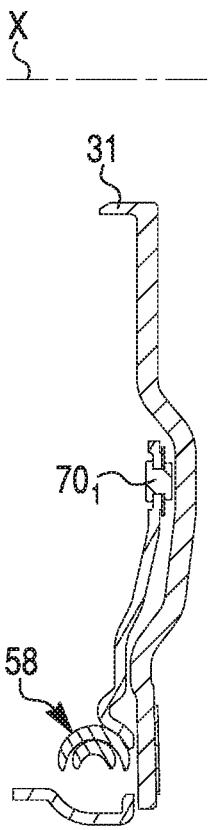

The locking piston 26 includes a substantially annular piston body 28, and an annular friction lining 27 fixedly attached to the piston body 28 so as to face the engagement surface 25 of the casing 12. The piston body 28 has two axially opposite surfaces: a first (or front) surface $37_1$ axially facing the engagement surface 25 of the casing 12, and a second (or rear) surface $37_2$ axially facing the turbine wheel 15 and the torsional vibration damper 16. As best shown in FIG. 1, the annular friction lining 27 is fixedly attached to the first surface $37_1$ of the piston body 28 at a radially outer peripheral end $29_1$ thereof by appropriate means known in the art, such as by adhesive bonding, as best shown in FIGS. 1 and 3.

Extending axially at a radially inner peripheral end $29_2$ of the piston body 28 is a substantially cylindrical flange 31 that is proximate the rotational axis X. The cylindrical flange 31 of the piston body 28 is axially slidingly mounted to the output hub 40. The sealing member (e.g., O-ring) 44 creates a seal at the interface of the substantially cylindrical flange 31 and the output hub 40. Accordingly, the locking piston 26 is rotatable and axially movable relative to the output hub 40 along this interface respectively into and out of a lock-up mode.

The torsional vibration damper 16 is housed in the casing 12 axially between the turbine wheel 32 and the first casing shell $20_1$ of the casing 12, as best shown in FIG. 1. The torsional vibration damper 16 includes a substantially annular drive (or input) member 56, a plurality of circumferential elastic damping members 58 circumferentially equidistantly spaced from one another, and a substantially annular driven (or output) member 60. According to the first exemplary embodiment of FIG. 1, the elastic damping members 58 are configured as helical (or coil) springs having a principal axis oriented substantially circumferentially. Other elastic members may be selected to replace or supplement the springs 58. The drive member 56 and the driven member 60 engage circumferentially opposite ends of the elastic damping members 58. Accordingly, the drive member 56 is elastically coupled to the driven member 60 through the elastic damping members 58, as is well known in the art. Thus, the driven member 60 of the damper assembly 16 is rotatable relative to the drive member 56 due to elasticity of the elastic damping members 58, which absorb torsional vibration.

The drive member 56 is fixedly (i.e., non-moveably) connected to the turbine shell 35 of the turbine wheel 32 through a connection member 62. Specifically, the connection member 62 is fixedly connected to the turbine shell 35 of the turbine wheel 32, such as by welding, which may be continuous annular welds or spot welds 63, or mechanical fasteners, to extend outside of the torus chamber 52. In turn, the drive member 56 is fixedly connected to the connection member 62, such as by welding, which may be continuous annular welds or spot welds 64, or mechanical fasteners, as shown in FIG. 1.

The driven member 60 is fixedly (i.e., non-movably) connected to the output hub 40, such as by rivets 65, or welding, or mechanical fasteners, so as to be non-rotatable relative to the output hub 40. Alternatively, the non-rotatable connection between the driven member 60 and the output hub 40 may be formed by splines. Thus, the turbine wheel 32 is elastically coupled to the output hub 40 through the damper assembly 16. In other words, the turbine wheel 32 is rotatable relative to the output hub 40.

Figure 2:
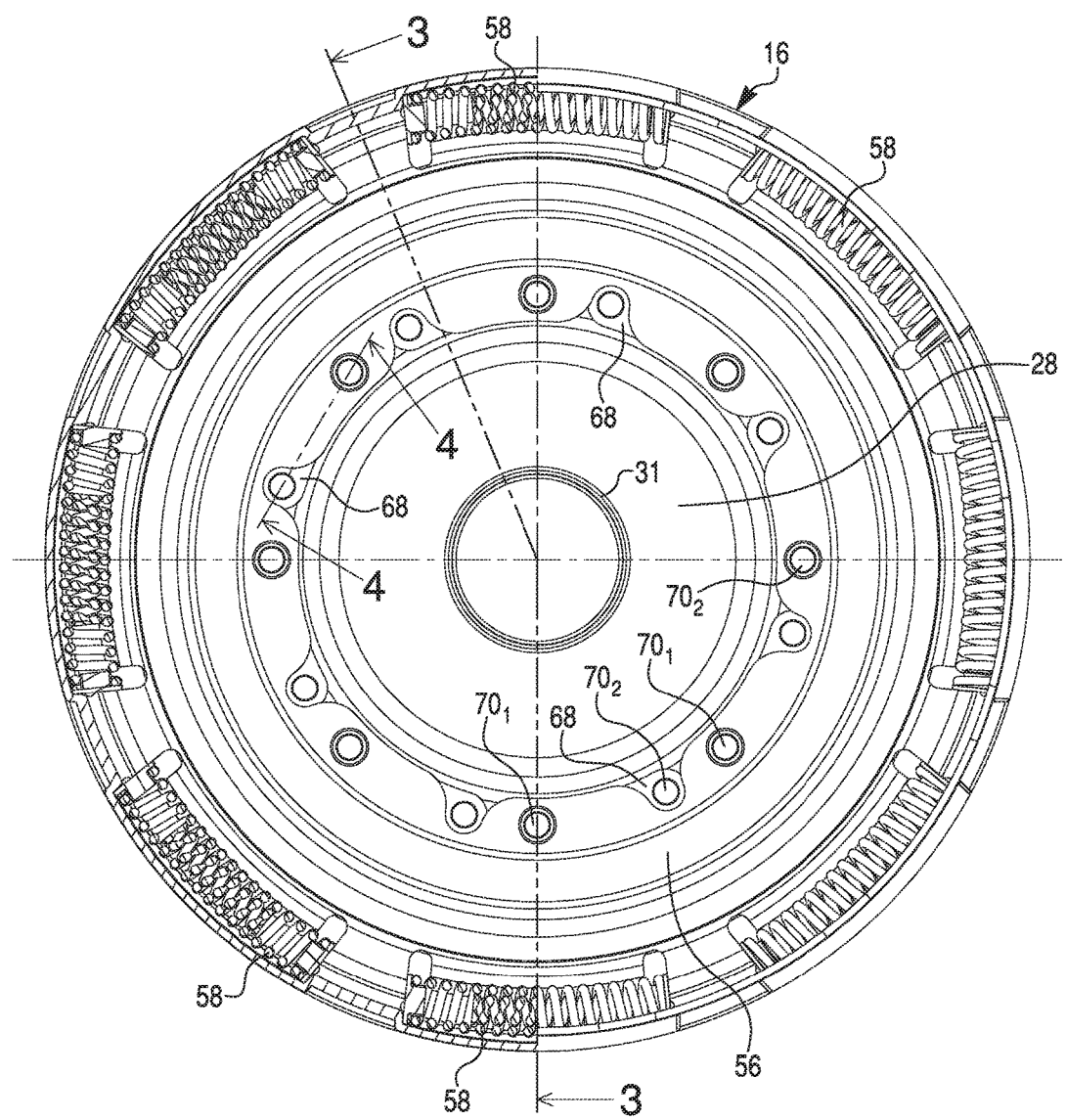
FIG. 2 is a front view of a torsional vibration damper of the hydrokinetic torque-coupling device in accordance with the first exemplary embodiment of the present invention.
Figure 4:
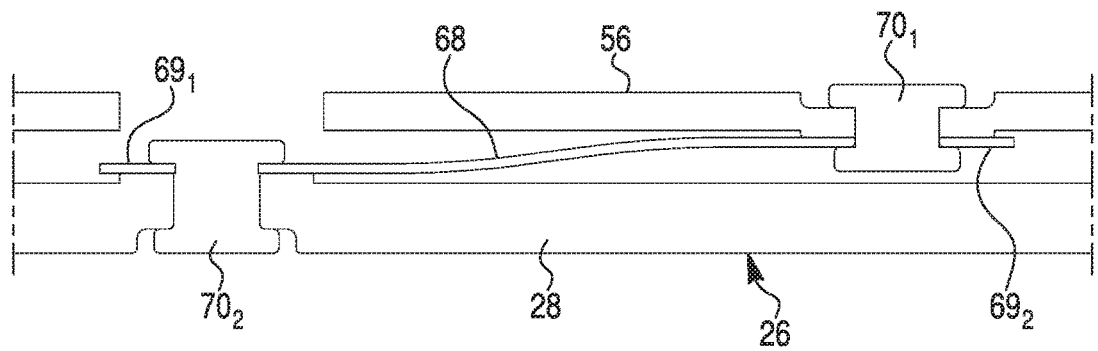
FIG. 4 is a fragmented cross-sectional view of the hydrokinetic torque-coupling device in accordance with the first exemplary embodiment of the present invention taken along the line 4-4 in FIG. 2.
Figure 5:
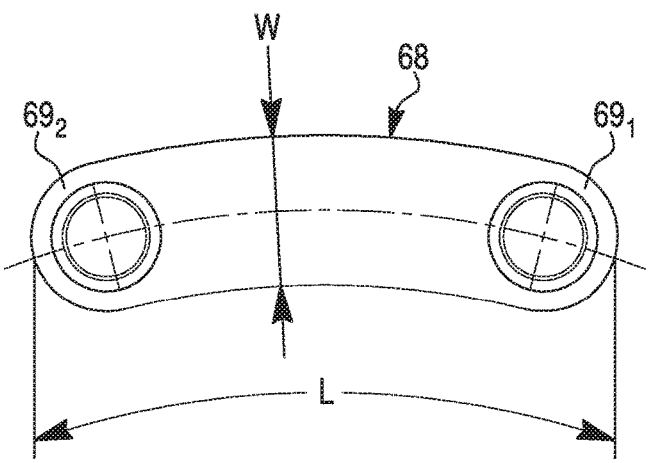
FIG. 5 is a front view of a flexible connection strap drivingly connecting a locking piston with a drive member of the torsional vibration damper according to the first exemplary embodiment of the present invention.

According to the first exemplary embodiment, the drive member 56 of the damper assembly 16 and the piston body 28 of the locking piston 26 are drivingly connected together by a plurality of flexible connection straps 68. Each of the connection straps 68 has a first fixing end $69_1$ fixed (i.e., non-moveably attached) to the drive member 56 of the damper assembly 16 by rivets $70_1$, and a second fixing end $69_2$ fixed (i.e., non-moveably attached) to the piston body 28 of the locking piston 26 by rivets $70_2$, as best shown in FIGS. 2, 4 and 5. Preferably, the connection straps 68 are flexible, rectangular metal strips, such as steel strips, each having a length L (a distance between the first and second fixing ends $69_1$ and $69_2$) substantially larger than a width W (a distance between radially inner and outer edges of the connection strap 68), as best shown in FIG. 5. Specifically, each of the connection straps 68 is flexible in the direction perpendicular to a line extending between the first and second fixing ends $69_1$, $69_2$ of the connection straps 68.

As best shown in FIG. 4, the first and second fixing ends $69_1$ and $69_2$ of each of the connection straps 68 are angularly offset from each other with respect to a plane perpendicular to the rotational axis X. Moreover, each of the connection straps 68 is bent so that the first and second fixing ends $69_1$, $69_2$ of each of the connection straps 68 are mutually offset axially in the direction of the rotational axis X.

According to the first exemplary embodiment, the locking piston 26 is drivingly (i.e., non-rotatably) connected to the drive member 56 of the damper assembly 16 via the connection straps 68. In this way, the rotational movement (and torque) from the locking piston 26 is transmitted to the drive member 56 of the damper assembly 16 through the connection straps 68. At the same time, due to the flexibility of the connection straps 68 in the axial direction, the locking piston 26 is axially moveable relative to the drive member 56 of the damper assembly 16.

Referring to FIG. 1, the casing 12 and the locking piston 26 collectively define a first pressure chamber 52 on the left side of the locking piston 26, and a second pressure chamber 54 on the right side of the locking piston 26. The first chamber 52 is defined between the turbine shell 35 and the locking piston 26, while the second chamber 54 is defined between the locking piston 26 and the first casing shell $20_1$.

The locking piston 26 is axially moveable between the disengaged position (non-lockup mode) and the engaged position (lockup mode) of the locking clutch 18. The motion of the locking piston 26 is controlled by the pressure differential across the pressure chambers 52, 54 positioned on either side of the locking piston 26. In the disengaged position, the locking piston 26 is axially spaced from the engagement surface 25 of the casing 12 and rotationally disengaged therefrom. Accordingly, in the disengaged position the locking piston 26 and the casing 12 (thus, the impeller 30) are rotatable relative to one another. In the engaged position, the locking piston 26 with the friction lining 27 frictionally non-rotatably engages the engagement surface 26 of the casing 12 so as to non-rotatably connect the turbine wheel 32 to the casing 12, and thus non-rotatably couple the turbine wheel 32 and the impeller 30 to one another.

In operation, when the lock-up clutch 18 is in the disengaged position (non-lockup mode), the engine torque is transmitted from the impeller wheel 30 by the turbine wheel 32 of the torque converter 14 to the output hub 40 through the torsional vibration damper 16. When the lock-up clutch 18 is in the engaged (locked) position (i.e., when the locking piston 26 is engaged (or locked) against the engagement surface 25 of the casing 12 by action of the hydraulic pressure), the engine torque is transmitted by the casing 12 to the output hub 40 through the torsional vibration damper 16.

An exemplary method for assembling the hydrokinetic torque-coupling device 10 of the first exemplary embodiment of FIGS. 1-4 will now be explained. While the methods for assembling the hydrokinetic torque-coupling device 10 may be practiced by sequentially performing the steps as set forth below, it should be understood that the methods may involve performing the steps in different sequences. It should be understood that this exemplary method may be practiced in connection with the other embodiments described herein. This exemplary method is not the exclusive method for assembling the hydrokinetic torque-coupling devices described herein.

The exemplary method for assembling the hydrokinetic torque-coupling device 10 of the first exemplary embodiment of FIGS. 1-4 is as follows. The impeller wheel 30, the turbine wheel 32, the stator 34, the locking piston 26 and the torsional vibration damper 16 may each be preassembled. The turbine wheel 32 includes, as noted above, the turbine shell 35 and the turbine blades 36 attached to the turbine shell 35.

First, the connection member 62 is fixedly connected to an outer peripheral surface of the turbine shell 35 of the turbine wheel 32, such as by welding, which may be continuous annular welds or spot welds 63, or mechanical fasteners, to extend outside of the torus chamber 52.

Then, the turbine shell 35 of the turbine wheel 32 is rotatably mounted to the output hub 40 coaxially with the rotational axis X. Next, the driven member 60 is fixedly (i.e., non-movably) connected to the output hub 40, such as by rivets 65, or welding, or mechanical fasteners, so as to be non-rotatable relative to the output hub 40. Alternatively, the non-rotatable connection between the driven member 60 and the output hub 40 may be formed by splines.

After that, the piston body 28 of the locking piston 26 is non-rotatably connected to the drive member 56 of the torsional vibration damper 16 through the flexible connection straps 68 so as to be axially moveable relative to the drive member 56 of the torsional vibration damper 16 due to the flexibility of the connection straps 68 in the axial direction. Specifically, the first fixing end $69_1$ of each of the connection straps 68 is fixed to drive member 56 of the damper assembly 16 by rivets $70_1$, then the second fixing end $69_2$ thereof is fixed to the piston body 28 of the locking piston 26 by rivets $70_2$.

Next, the drive member 56 of the torsional vibration damper 16 is fixedly connected to the connection member 62, such as by welding, which may be continuous annular welds or spot welds 64, or mechanical fasteners, as shown in FIG. 1. At the same time, the locking piston 26 is mounted on the output hub 40 by axially sliding the cylindrical flange 31 of the piston body 28 over the output hub 40 so that the cylindrical flange 31 of the piston body 28 frictionally engages the sealing member, such as an O-ring 44, of the output hub 40.

After that, the cover shell $20_1$ is sealingly fixed to the impeller shell $20_2$ of the casing 12, such as by welding 19 at their outer peripheries, so that the torque converter 14 with the torsional vibration damper 16 and the lock-up clutch 18 are sealed within the casing 12.

Various modifications, changes, and alterations may be practiced with the above-described embodiment.

In a hydrokinetic torque-coupling device 110 of a second exemplary embodiment illustrated in FIGS. 6-10, the connection straps 68 are replaced by a splined connection 138. The hydrokinetic torque-coupling device 110 of FIGS. 6-10 corresponds substantially to the hydrokinetic torque-coupling device 10 of FIGS. 1-5, and only the portions, which differ, will therefore be explained in detail below.

Figure 6:
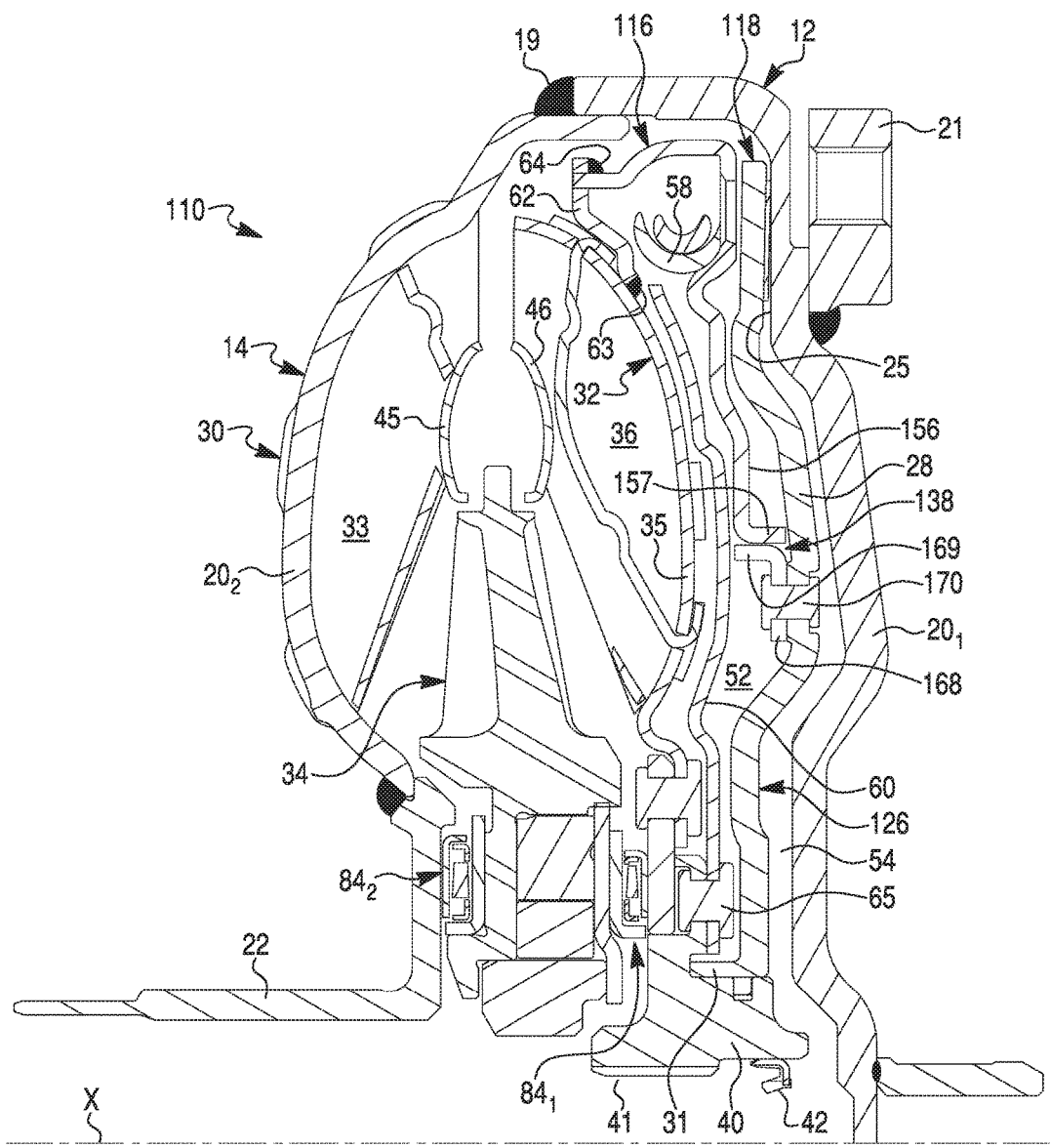
FIG. 6 is a fragmented half-view in axial section of a hydrokinetic torque-coupling device in accordance with a second exemplary embodiment of the present invention.

In the second exemplary embodiment of the present invention illustrated in FIG. 6, the hydrokinetic torque-coupling device 110 includes a sealed casing 12 filled with a fluid, such as oil or transmission fluid, a torque converter 14, a torsional vibration damper (also referred to herein as a damper assembly) 116, and a friction locking clutch 118 are all rotatable about a rotational axis X.

The lock-up clutch 118 includes a locking piston 126 axially displaceable along the rotational axis X toward (an engaged position (or lockup mode) of the lock-up clutch 118) and away (a disengaged position (or non-lockup) of the lock-up clutch 118) from the engagement surface 25 inside the cover shell $20_1$ of the casing 12. The locking piston 126 includes a substantially annular piston body 28, and an annular friction lining 27 fixedly attached to the piston body 28 so as to face the engagement surface 25 of the casing 12.

The torsional vibration damper 116 includes a substantially annular drive (or input) member 156, a plurality of circumferential elastic damping members 58 circumferentially equidistantly spaced from one another, and a substantially annular driven (or output) member 60. The drive member 156 is elastically coupled to the driven member 60 through the elastic damping members 58, as is well known in the art. Thus, the driven member 60 of the damper assembly 116 is rotatable relative to the drive member 156 due to elasticity of the elastic damping members 58, which absorb torsional vibration.

The drive member 156 is fixedly (i.e., non-moveably) connected to the turbine shell 35 of the turbine wheel 32 through connection member 62. Specifically, the connection member 62 is fixedly connected to the turbine shell 35 of the turbine wheel 32, such as by welding, which may be continuous annular welds or spot welds 63, or mechanical fasteners, to extend outside of the torus chamber 52. In turn, the drive member 156 is fixedly connected to the connection member 62, such as by welding, which may be a continuous annular weld or spot welds 64, as shown in FIG. 6, or mechanical fasteners. The drive member 156 has an integral cylindrical coupling ring 157 at a radially inner end of the drive member 156. The coupling ring 157 is formed with internal splines (or gear teeth) 161, best shown in FIGS. 8 and 9. The drive member 156 and the coupling ring 157 are embodied as integral with one another, e.g., made of a single or unitary component, but may be separate components non-moveably connected together.

According to the second exemplary embodiment, the drive member 156 of the torsional vibration damper 116 and the piston body 28 of the locking piston 126 are drivingly (non-rotatably) connected together by the splined connection 138, as best shown in FIG. 6. Specifically, the locking piston 126 further includes an annular connecting member 168 fixedly (i.e., non-movably) connected to the piston body 28, such as by rivets 170, or welding, or mechanical fasteners. The annular connecting member 168 has a cylindrical spline ring 169 formed with external splines (or gear teeth) 172 complementary to the internal splines 161 of the drive member 156. The annular connecting member 168 and the cylindrical spline ring 169 are embodied as integral with one another, e.g., made of a single or unitary component, but may be separate components non-moveably connected together.

Figure 7:
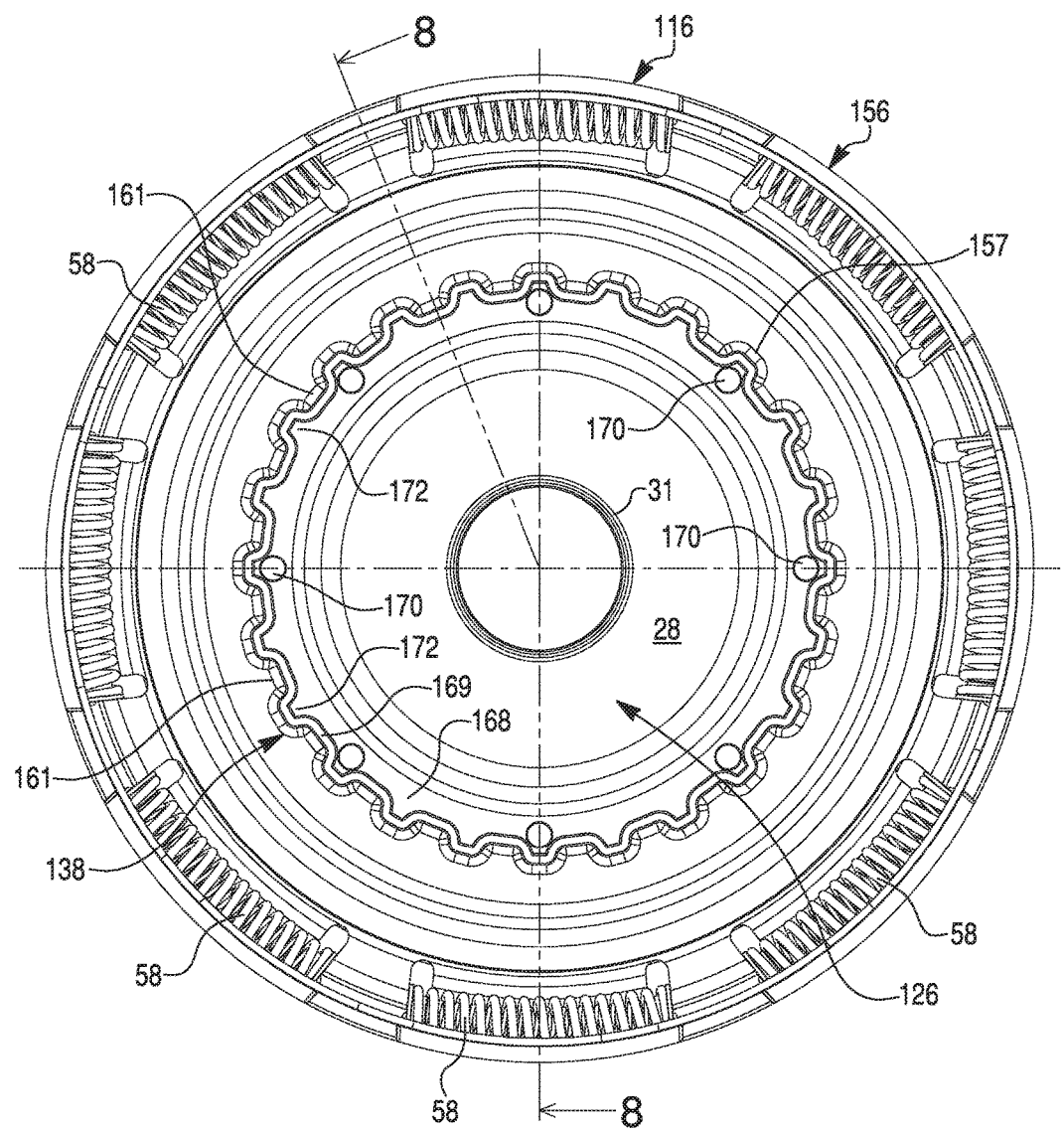
FIG. 7 is a front view of a torsional vibration damper of the hydrokinetic torque-coupling device in accordance with the second exemplary embodiment of the present invention.
Figure 8:
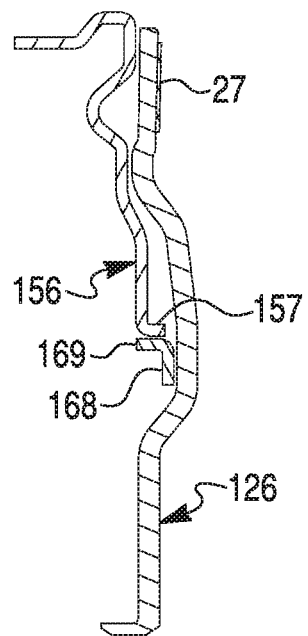
FIG. 8 is a fragmented cross-sectional view of the hydrokinetic torque-coupling device in accordance with the second exemplary embodiment of the present invention taken along the line 8-8 in FIG. 7 showing a locking piston and a drive member of the torsional vibration damper only.
Figure 8:
Figure 8:
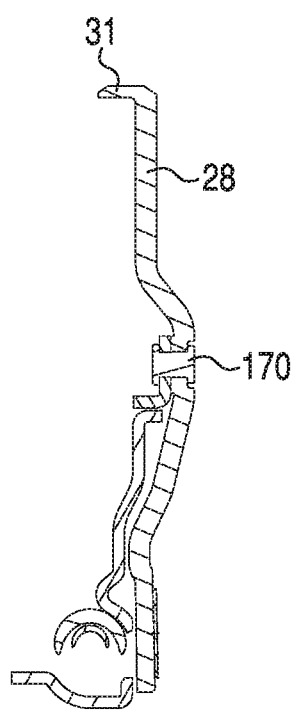

As best shown in FIG. 7, the external splines 172 of the spline ring 169 of the locking piston 126 drivingly engage the internal splines 161 of the coupling ring 157 of the drive member 156. In other words, the locking piston 126 is non-rotatably coupled to the drive member 156 of the torsional vibration damper 116. At the same time, due to the nature of the splined connection, the locking piston 126 is axially moveable relative to the drive member 156 of the torsional vibration damper 116.

The locking piston 126 is axially moveable between the disengaged position (non-lockup mode) and the engaged position (lockup mode) of the locking clutch 118. The motion of the locking piston 126 is controlled by the pressure differential across the pressure chambers 52, 54 positioned on either side of the locking piston 126. In the disengaged position, the locking piston 126 is axially spaced from the engagement surface 25 of the casing 12 and rotationally disengaged therefrom. Accordingly, in the disengaged position the locking piston 126 and the casing 12 (thus, the impeller 30) are rotatable relative to one another. In the engaged position, the locking piston 126 with the friction lining 27 frictionally non-rotatably engages the engagement surface 126 of the casing 12 so as to non-rotatably connect the turbine wheel 32 to the casing 12, thus non-rotatably couple the turbine wheel 32 and the impeller 30 to one another.

In operation, when the lock-up clutch 118 is in the disengaged position (non-lockup mode), the engine torque is transmitted from the impeller wheel 30 by the turbine wheel 32 of the torque converter 14 to the output hub 40 through the torsional vibration damper 16. When the lock-up clutch 118 is in the engaged (locked) position (i.e., when the locking piston 126 is engaged (or locked) against the engagement surface 25 of the casing 12 by action of the hydraulic pressure), the engine torque is transmitted by the casing 12 to the output hub 40 through the torsional vibration damper 116.

The exemplary method for assembling the hydrokinetic torque-coupling device 110 of the second exemplary embodiment of FIGS. 6-10 is as follows. The impeller wheel 30, the turbine wheel 32, the stator 34, the locking piston 126 and the torsional vibration damper 116 may each be preassembled. The turbine wheel 32 includes, as noted above, the turbine shell 35 and the turbine blades 36 attached to the turbine shell 35.

First, the connection member 62 is fixedly connected to an outer peripheral surface of the turbine shell 35 of the turbine wheel 32, such as by welding, which may be continuous annular welds or spot welds 63, or mechanical fasteners, to extend outside of the torus chamber 52.

Then, the turbine shell 35 of the turbine wheel 32 is rotatably mounted to the output hub 40 coaxially with the rotational axis X. Next, the driven member 60 is fixedly (i.e., non-movably) connected to the output hub 40, such as by rivets 65, or welding, or mechanical fasteners, so as to be non-rotatable relative to the output hub 40. Alternatively, the non-rotatable connection between the driven member 60 and the output hub 40 may be formed by splines.

After that, the drive member 156 of the damper assembly 116 is fixedly connected to the connection member 62, such as by welding, which may be a continuous annular weld or spot welds 64, as shown in FIG. 5, or mechanical fasteners. The drive member 156 is provided with the coupling ring 157 formed with internal splines 161.

Next, the annular connecting member 168 is fixedly connected to the piston body 28, such as by the rivets 170, or welding, or mechanical fasteners, so that the splines 172 of the spline ring 169 facing radially outwardly. Then, the piston body 28 of the locking piston 126 is non-rotatably connected to the drive member 156 of the torsional vibration damper 116 through the splined connection 138 so as to be axially moveable relative to the drive member 156 of the torsional vibration damper 116 due to the nature of a spline connection. Specifically, the locking piston 126 is mounted on the output hub 40 by axially sliding the cylindrical flange 31 of the piston body 28 over the output hub 40 toward the drive member 156 of the torsional vibration damper 116 until the splines 172 of the locking piston 126 drivingly engage the splines 161 of the drive member 156.

After that, the cover shell $20_1$ is sealingly fixed to the impeller shell $20_2$ of the casing 12, such as by welding 19 at their outer peripheries, so that the torque converter 14 with the torsional vibration damper 116 and the lock-up clutch 118 are sealed within the casing 12.

The foregoing description of the exemplary embodiment (s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque-coupling device for coupling together a driving shaft and a driven shaft, the hydrokinetic torque-coupling device comprising:

a casing rotatable about a rotational axis and having an engagement surface;

a torque converter including an impeller wheel and a turbine wheel disposed in the casing coaxially with the rotational axis;

a locking piston including an annular piston body, the piston body having a front surface axially facing the engagement surface of the casing, the locking piston axially moveable along the rotational axis to and from the engagement surface of the casing so as to selectively frictionally engage the locking piston against the engagement surface of the casing in a lock-up mode; and a torsional vibration damper comprising
an input member rotatable about the rotational axis and non-moveably attached to the turbine wheel;
a plurality of circumferentially acting elastic members; and
an output member elastically coupled to the input member through the elastic members;
the locking piston non-rotatably connected to and axially moveable relative to the input member of the torsional vibration damper;
the locking piston non-rotatably connected to and axially moveable relative to the input member of the torsional vibration damper via a splined connection;
the input member of the torsional vibration damper having internal splines;
the locking piston provided with external splines drivingly engaging the internal splines of the input member of the torsional vibration damper so that the locking piston is axially moveable relative to the input member of the torsional vibration damper.

2. The hydrokinetic torque-coupling device as defined in claim 1, wherein the locking piston further includes an annular friction lining fixedly attached to the front surface of the piston body.

3. The hydrokinetic torque-coupling device as defined in claim 1, further comprising a plurality of connection straps non-rotatably connecting the locking piston to the input member of the torsional vibration damper so that the locking piston is axially moveable relative to the input member of the torsional vibration damper.

4. The hydrokinetic torque-coupling device as defined in claim 3, wherein each of the connection straps is provided with a first fixing end fixed to the input member of the torsional vibration damper and a second fixing end fixed to the piston body of the locking piston, and wherein the connection straps are flexible in the axial direction.

5. The hydrokinetic torque-coupling device as defined in claim 4, wherein the first and second fixing ends of each of the connection straps are angularly offset from each other with respect to a plane perpendicular to the rotational axis.

6. The hydrokinetic torque-coupling device as defined in claim 4, wherein each of the connection straps is bent so that the first and second fixing ends of each of the connection straps are mutually offset axially in the direction of the rotational axis.

7. The hydrokinetic torque-coupling device as defined in claim 1, further comprising an output hub elastically coupled to the turbine wheel via the torsional vibration damper, and wherein the output member of the torsional vibration damper is non-rotatably secured to the output hub.

8. The hydrokinetic torque-coupling device as defined in claim 7, wherein the locking piston is mounted on and is axially moveable relative to the output hub.

9. The hydrokinetic torque-coupling device as defined in claim 1, wherein the drive member of the torsional vibration damper has an integral cylindrical coupling ring at a radially inner end thereof, and wherein the coupling ring is formed with the internal splines.

10. The hydrokinetic torque-coupling device as defined in claim 9, wherein the locking piston further includes an annular connecting member fixedly connected to the piston body, and wherein the annular connecting member has a cylindrical spline ring formed with external splines complementary to the internal splines of the drive member of the torsional vibration damper.

11. The hydrokinetic torque-coupling device as defined in claim 10, wherein the locking piston is mounted on and is axially moveable relative to the output hub.

12. The hydrokinetic torque-coupling device as defined in claim 1, further comprising an output hub elastically coupled to the turbine wheel via the torsional vibration damper, and wherein the output member of the torsional vibration damper is non-rotatably secured to the output hub.

13. A method for assembling a hydrokinetic torque-coupling device for coupling together a driving shaft and a driven shaft, the method comprising the steps of:
providing a torque converter comprising an impeller wheel and a turbine wheel coaxial with a rotational axis;
providing a locking piston including an annular piston body coaxial with the rotational axis;
providing a torsional vibration damper comprising
an input member formed with internal splines thereon;
a plurality of circumferentially acting elastic members; and
an output member formed with external splines thereon and elastically coupled to the input member through the elastic members; and
mounting the locking piston to the torsional vibration damper coaxially with the input member by non-rotatably coupling the input member of the torsional vibration damper with the locking piston by sliding the locking piston axially toward the input member of the torsional vibration damper until the external splines on the locking piston drivingly engage the internal splines of the input member so that the locking piston is non-rotatably connected to and axially moveable relative to the input member of the torsional vibration damper.

14. The method as defined in claim 13, further comprising the step of non-moveably securing the input member of the torsional vibration damper to the turbine wheel.

15. The method as defined in claim 13, further comprising the steps of:
providing a plurality of connection straps; and
non-rotatably connecting the piston body of the locking piston to the input member of the torsional vibration damper with the connection straps so that the locking piston is axially moveable relative to the input member of the torsional vibration damper.

16. The method as defined in claim 13, further comprising the steps of:
providing an output hub; and
non-rotatably securing the output hub to the output member of the torsional vibration damper.

17. The method as defined in claim 16, further comprising the step of mounting the locking piston on the output hub by axially sliding the piston body of the locking piston over the output hub.

* * * * *